(12) United States Patent
Hay et al.

(10) Patent No.: US 6,511,175 B2
(45) Date of Patent: Jan. 28, 2003

(54) APPARATUS AND METHOD FOR TREATMENT OF AMBLYOPIA

(76) Inventors: Sam H. Hay, 310 Clinton Ave., West, Huntsville, AL (US) 35801; Lewis N. Graham, 215 Sunset Cr., West, Madison, AL (US) 35758

( * ) Notice: Subject to any disclaimer, the term of this patent is extended or adjusted under 35 U.S.C. 154(b) by 24 days.

(21) Appl. No.: 09/758,411

(22) Filed: Jan. 10, 2001

(65) Prior Publication Data

US 2001/0050754 A1 Dec. 13, 2001

Related U.S. Application Data

(60) Provisional application No. 60/175,312, filed on Jan. 10, 2000.

(51) Int. Cl.[7] .................................................. G02C 7/16
(52) U.S. Cl. ........................................................ 351/45
(58) Field of Search .............................. 351/44, 45, 49, 351/201; 359/275, 722

(56) References Cited

U.S. PATENT DOCUMENTS

| 5,452,026 A | * | 9/1995 | Marcy, III | 351/45 |
| 5,552,841 A | * | 9/1996 | Gallorini et al. | 351/49 |
| 5,608,567 A | * | 3/1997 | Grupp | 359/275 |

* cited by examiner

Primary Examiner—George Manuel
(74) Attorney, Agent, or Firm—Mark Clodfelter

(57) ABSTRACT

A method for treating amblyopia in children is disclosed. A pair of eyeglasses or goggles is provided with an electrically and selectively darkenable lens, such as am LCD lens, so that for selected portions of time, one or the other eye may be occluded. In one embodiment, circuitry for providing pulses of a selected width to one or both lenses is incorporated in the eyeglasses or goggles, with the lens associated with the deviating eye receiving a wider pulse than the lens associated with the other eye. Thus, the deviating eye is occluded for a longer period of time than the normal eye. In another embodiment, a computer is coupled to the eyeglasses or goggles, and is provided with a program of interest to the child which selectively occludes the deviating eye.

7 Claims, 3 Drawing Sheets

APPARATUS AND METHOD FOR TREATMENT OF AMBLYOPIA

This Application claims the benefit of Ser. No. 60/175,312, filed Jan. 10, 2000.

FIELD OF THE INVENTION

This invention relates to the treatment of amblyopia, also known as "lazy eye", in children. Particularly, the invention utilizes a pair of glasses fitted with LCD lenses that are selectively made opaque in order to force the child to exercise the weak eye.

BACKGROUND OF THE INVENTION

Amblyopia (lazy eye) is probably the most common cause of monocular blindness. It occurs in about 4% of the population, with between 80,000–160,000 new cases occurring yearly in the United States. This neurological condition is believed to occur due to a neural input imbalance of either the optical power of the eyes or ocular misalignment. Both of these conditions may result in an incompatible binocular visual input to the visual centers of the brain that prevents a normal, single visual perception. This incompatability of visual perception induces a competitive inhibition between the two eyes resulting in a "strong eye" and a "weak eye". Here, the visual utility of the "strong eye" becomes dominant over the "weak eye" and results in permanent structural degradation of the cellular anatomy of portions of the lateral genticulate body and visual cortex of the occipital lobe of the brain. This degradation results in loss of visual acuity and loss of higher order binocular functions, such as stereopsis. After visual maturity of the child is reached, which is about 10 years of age, the disease becomes permanent.

The accepted treatment of this disorder involves blocking or reducing vision in the strong, good eye, as by a patch, in order to force the weaker eye to "work harder". This establishes and reinforces the development of neural pathways in the brain to cause proper connections to develop between the weak, amblyopic eye and the visual cortex. After a period of time, which may be between months and years, use of the patch is gradually reduced, affording both eyes the opportunity to develop normal binocular vision.

There exist two primarily accepted methods for treating amblyopia. The most effective method involves placing a patch over the strong eye, forcing the weak eye to work harder and reinforce neural pathways for vision in the brain. One commonly recommended regimen is to patch the strong eye for up to a week for every year of the child's age until vision is restored, with the process being repeated if there is no improvement.

Problems with patching are basically that the patient cannot see well and the obviousness of the patch creates negative social implications. This in turn typically generates resistance and poor compliance from the child, and anxiety in both the child and parents. Medically, the practice of patching is not without risk. One such risk is that of inducing a crossing of the child's eyes in those types of amblyopia in which the eyes are undeviated with a hyperopic refractive error. Reversing of the amblyopic condition to the strong eye has also been reported. In addition, development of normal binocular vision during the patching treatment is interrupted.

A device has been developed that monitors and records actual wearing time of the patch so that in cases where there is no medical improvement of the patient, a physician can determine whether the failure was due to noncompliance or possibly due to a different underlying disorder. During the use of this device, it was discovered that the practice of patching had a very poor compliance rate. Here, it was found that actual average compliance rate was on the order of only about 5 minutes a day, yet many of these children had successful results. With this finding, it is believed that strict compliance of only 30 minutes or so a day may result in successful treatment.

In an attempt to overcome the difficulties of patching, a technique known as "penalization" has been developed. In this treatment, the strong eye is optically and pharmacologically weakened so that the child is forced to use the weak eye more. However, this treatment is less effective and is used more for maintenance than treatment.

In addition to the foregoing, it has been suggested that if the child is immersed in an activity during periods of treatment, such a play activity or other activity that requires concentration by the child, recovery occurs more rapidly than if the child is not focussed or not concentrating. As such, an interactive computer game or interesting video that holds the interest of the child may accelerate treatment time.

SUMMARY

Apparatus for treating diseases of the class including amblyopia is disclosed. An eyeglasses frame or goggles is adapted to hold LCD cells that the patient looks through, with circuitry coupled to each of the LCD cells. The circuitry may be configured to provide control signals to the LCD cells so that the strong eye is either partially or fully occluded.

DETAILED DESCRIPTION OF THE DRAWINGS

Figure 1:
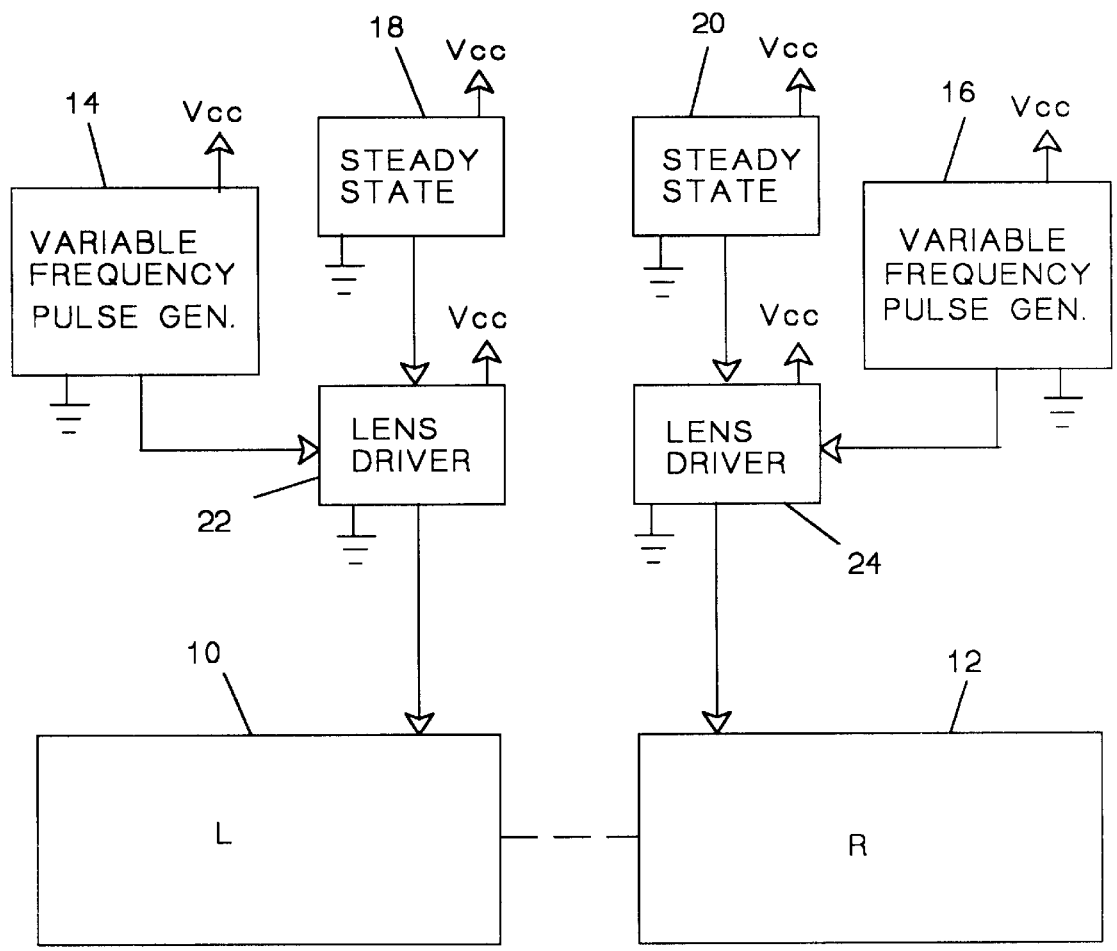
FIG. 1 is a block diagram of one embodiment of the invention.

In accordance with one embodiment of this invention, and referring to the basic example shown in FIG. 1, a pair of liquid crystal (LCD) cells 10 and 12 for the left eye and right eye, respectively, are coupled to circuitry (shown in block diagram form) for independently controlling each of LCD cells 10 and 12. Cells 10 and 12 may be configured as lenses for eyeglasses or goggles of the type that cover or encompass substantially all of the visual field of the wearer, preferably with as little peripheral vision as possible being exposed. In addition, these lenses may either cover existing spectacles or may be incorporated into prescription eyeglasses to maximally correct the refractive error of the eyes in an attempt to achieve optical balance. Additionally, since the electronics for powering the LCD lenses is relatively simple and the lenses themselves require little power, all circuitry, along with batteries for powering the circuitry and lenses, may be incorporated into a frame or earpieces thereof. In another embodiment, the eyeglasses or goggles may be connected by an infrared link or by conductors to a microprocessor-controlled device, such as a personal computer, or to a microcomputer-type device worn or carried by the user. In these embodiments a computer program implements operation of the circuitry shown in FIG. 1.

Figure 1A:
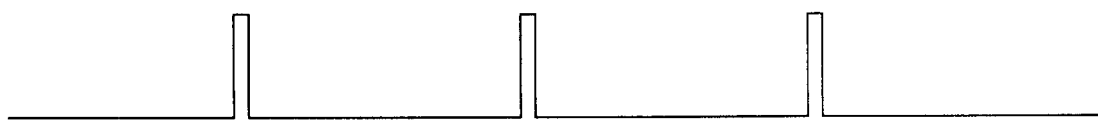
FIG. 1a is a diagram of waveforms of the embodiment of FIG. 1.

One example of a pair of goggles utilizing LCD lenses may be found in U.S Pat. No. 4,967,268 to Lipton et. Al., and which is incorporated in its entirety herein by reference. This referenced patent discloses eyeglasses having liquid crystal lenses that serve as shutters that are alternately (with respect to each other) driven to transmissive and non-transmissive states synchronously with alternating visual fields presented on a display for the purpose of inducing stereoscopic effects on the display. For illustrative purposes not intended to be limiting, it is assumed that a HIGH electrical pulse will drive applicants LCD lenses to an opaque state and in the absence of a pulse the lenses will revert to a transparent state. The incorporated application to Lipton et. Al. is illustrative of features that may be included in Applicants method for treating amblyopia, and specifically show ways to drive LCD lenses and goggles incorporating LCD lenses In contrast, in one embodiment of Applicants eyeglasses, and as shown in FIG. 1, the LCD cells making up the lenses of the eyeglasses may be driven independently of one another by variable frequency pulse generators 14, 16, and may be driven at frequencies which are adjustable from 0 to about 10,000 Hz or more. These frequencies are provided to lens drivers 22 and 24, which in turn conventionally drive LCD lenses 10 and 12. Such frequencies may be in the form of a pulse train as shown in FIG. 1*a* wherein very short pulses are developed, with the spacing between the pulses being adjustable. As such, where the LED cells are driven to an opaque state upon occurrence of a pulse and revert to a transparent state in the absence of a pulse, the LCD cells become increasingly opaque with increasing frequency, i.e. the pulses being squeezed more closely together. In this embodiment, it is anticipated that the patient would not see the discrete transitions between transparent and opaque, the frequency being above that of flicker fusion, which is generally about 60 Hz or so. Instead, the patient would see a general lightening or darkening of the LCD lenses. Alternately, where the LCD cells are constructed to be of variable transmissivity, adjustment is provided to allow transmissivity of the cells to be varied from opaque to transparent. Further, the frequency of generators 14, 16 may be adjustable, as by a small potentiometer or other electrical adjustment mounted in the eyeglasses so as to be accessible only by a medical practitioner, so that degree of opacity may be adjusted over time as the subject is treated. Further yet, the LCD cells may be maintained, as by a switch, in a static clear or opaque state by steady state controllers 18, 20, which in turn provide steady state signals to drivers 22 and 24. Thus, vision in one or the other eye of a wearer may be selectively blocked entirely, or may be controllably reduced as needed.

In another embodiment, a timer or pseudorandom generator or both (not shown) may be coupled to frequency generators 14, 16 and steady state controllers 18, 20 in order to alternate vision between the left and right eyes either at preset timed intervals or at random intervals. In this instance, after covering of the strong eye for a relatively long period, vision may be switched to the strong eye for a brief period of time, and then switched back to the weak eye. This may assist in development of binocular vision. In a variant of this embodiment, alternation of vision between the left and right eyes may occur at rates ranging from flicker fusion rates to above fusion rates. Again, this would assist in forming neural pathways to develop normal binocular vision. In these embodiments both eyes may be somewhat occluded, but the strong eye would be more occluded over time so as to force the weaker eye to work harder.

In yet another embodiment, a sensor may be incorporated into the eyeglasses to detect ocular misalignment, with the eyeglasses being responsive to detected misalignment and providing a predetermined response. For instance, where an eye tends to wander in and out of alignment, occlusion of the strong eye may be provided during times of such wandering. In a variant of this embodiment, the glasses may be fitted with a prism responsive to the sensor to optically align the subject's deviating eye with his other eye. In this manner the two eyes are aligned to the object of regard and then gradually the alternating of vision between the eyes by use of variable occlusion may be utilized to induce proper alignment of the two eyes.

Figure 2:
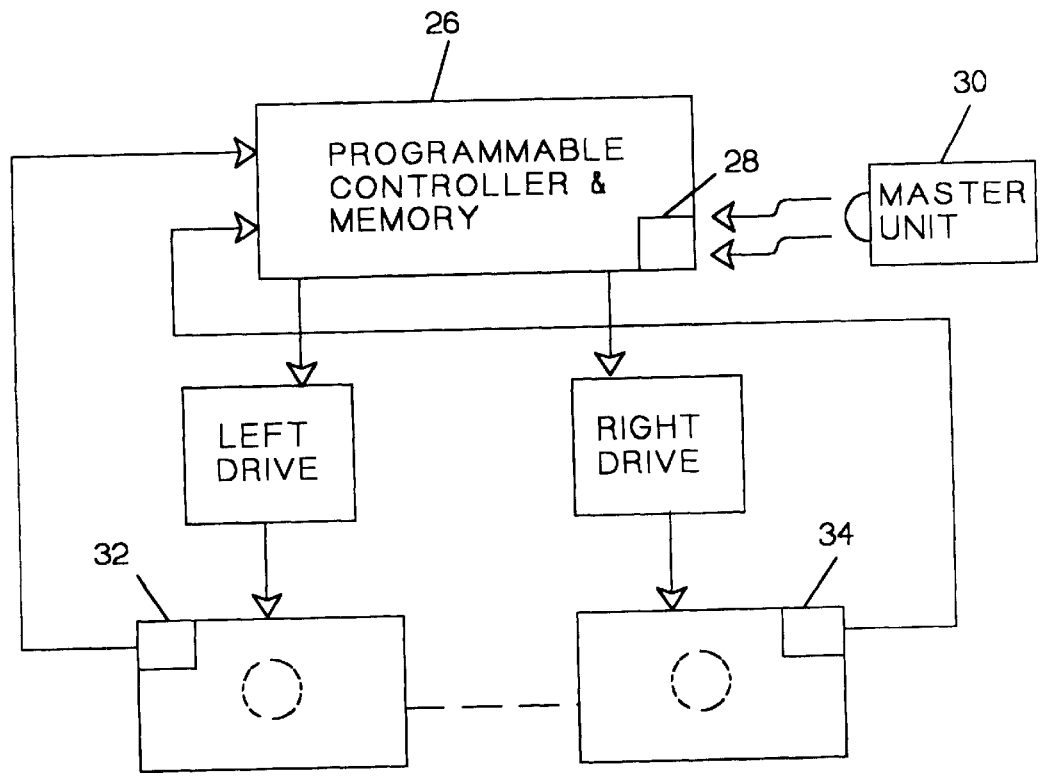
FIG. 2 is a block diagram of a programmable embodiment of the invention.

In still yet another embodiment, and referring to FIG. 2, a programmable controller and memory unit 26 may be incorporated in the eyeglasses, which controller including an infra-red interface 28. While an infra-red interface is shown, a wired connection may also be used, the wire conventionally terminating with a plug fitted into a receptacle in the eyeglasses. Interface 28 would communicate with a master unit 30, which typically would be located in a therapist's office. Here, a program would be loaded into controller 26 via the link to master unit 30, the program controlling operation of the LCD lenses, thus making operational parameters of the glasses unavailable to the user. In this or other embodiments, eye position trackers 32, 34 may be incorporated into the eyeglasses, trackers 32, 34 providing data as to position of the eyes relative to each other. Here, when controller 26 detects a deviation of one of the eyes, a signal is sent to partially or totally occlude the other eye. In addition to or substituting for occlusion, a feedback signal may be provided to the subject upon detection of a deviating eye. Also, rather than a partial or total occlusion uniformly over the eyeglass lens, a small circular region centered in the glasses (dashed lines) may be left transparent. This may force the deviating eye into the same relative alignment with the nondeviating eye.

Figure 3:
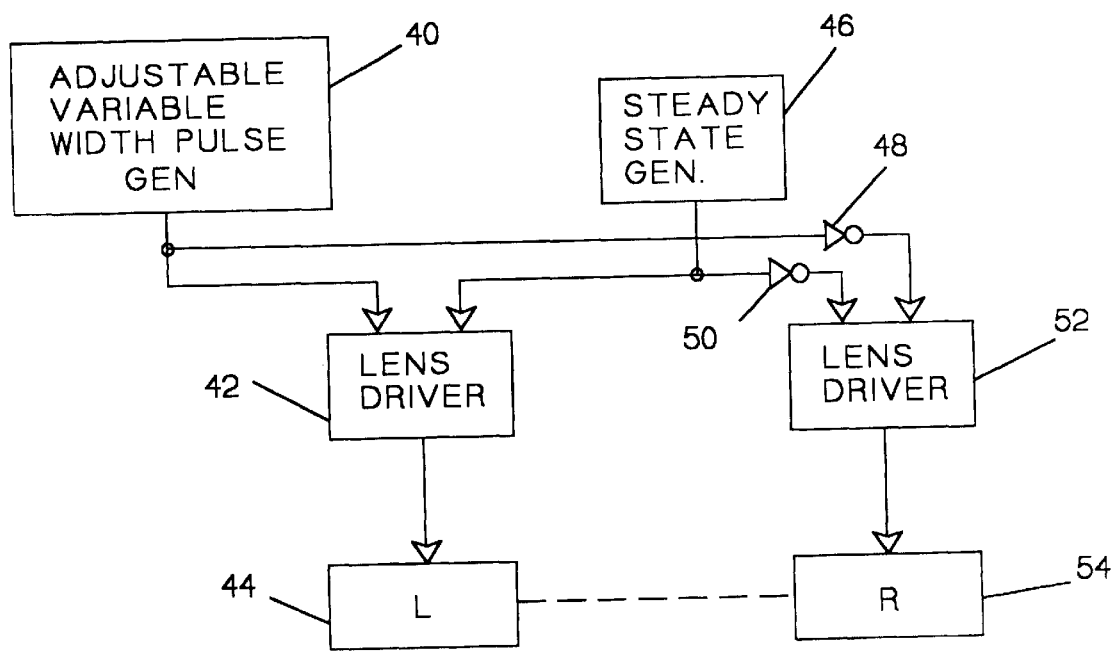
FIG. 3 is a block diagram of yet another embodiment of the invention.
Figure 3A:
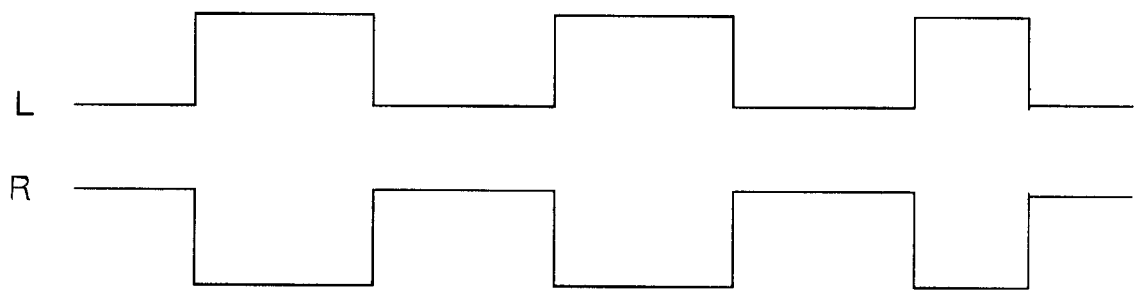
FIG. 3a is a diagram of waveforms that may be developed by the embodiment of FIG. 3.

In another embodiment, and as shown in FIG. 3, the pulse width may be varied so that the lenses are opaque or transparent a greater or less proportion of the time with increasing or decreasing pulse width. Here, a variable width pulse generator 40 provides a variable width pulse to lens driver 42 connected to one of the LCD cells, which by way of example the left LCD cell 44 being shown as receiving the variable width pulses from variable width pulse generator 40. Where a steady state drive is desired to maintain one or the other of lenses 44, 54 opaque or transparent, a steady state generator 46 may provide an appropriate signal to drivers 42, 52. As another feature of this embodiment, inverters 48, 50 invert the electrical signals from generators 40, 46 and provide the inverted signals to right lens driver 52, which in turn drives the right LCD cell 54. As shown in FIG. 3*a*, the variable width pulses are always in an inverse relationship, which darken the respective lens by occurrence of a pulse and lighten the respective lens in the absence of a pulse. As such, when powered, the lenses are always in an inverse relationship, i.e. when one is opaque the other is transparent, and vice versa. Here, where a wider pulse is applied to lens 44 to drive it to an opaque state, the other lens is driven to a transparent state for the duration of the wider pulse width. Conversely, a narrower pulse applied to lens 44 darkens it for a shorter period of time, resulting in the other lens 54 being transparent for a shorter interval. Thus, a patient's strong eye may be punished by adjusting the width of the pulses so that the strong eye receives a greater proportion of blockage than the weak eye. In this mode of operation where one eye or the other is always blocked, it is believed that seizure activity is prevented. This seizure activity is a well known phenomenon that occurs in a small percentage of the population, and is caused by flickering lights such as those developed by some video games and cartoons, physically moving past trees or fences that the sun is shining through, etc. It is also well known that shutting one eye prevents this type of seizure activity. As such, it is believed that this mode of operation would prevent this type of seizure from occurring in susceptible individuals.

Figure 3B:
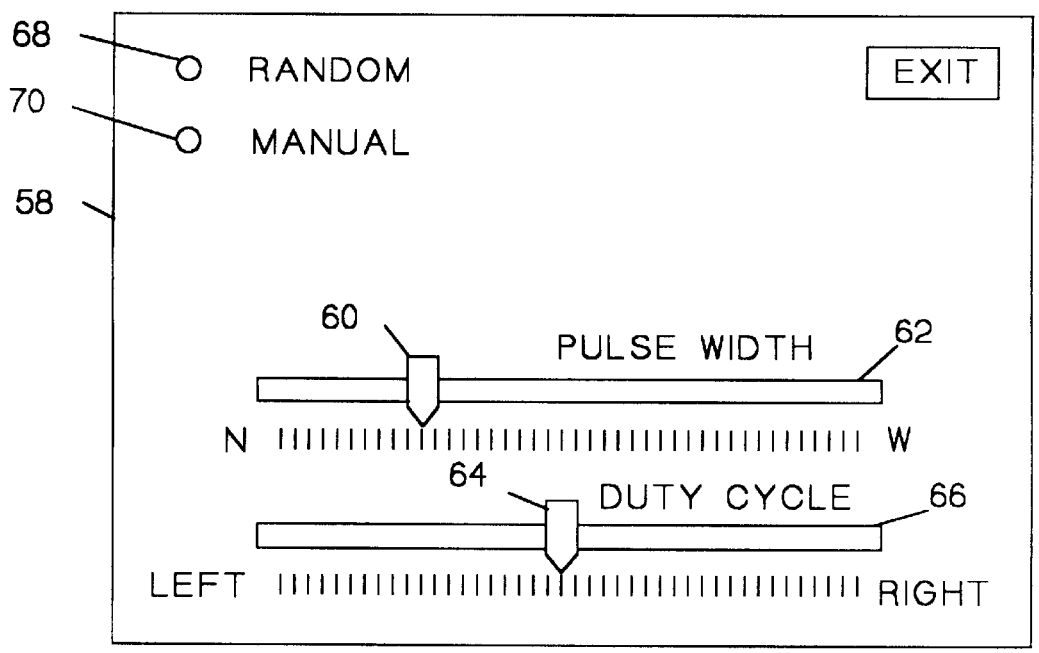
FIG. 3b is an illustration of a window of a control system as presented on a computer monitor.

In the instance where the embodiment of FIG. 3 is incorporated in a personal computer or the like, the goggles or glasses containing lenses 44, 54 may be conventionally connected by conductors or an infrared link to a port of the computer, such as a USB or serial port. A program is installed in the computer that presents a window such as that shown in FIG. 3b wherein a user under instructions from a medical practitioner may adjust which eye is punished and the extent of the punishment. In the window 58 shown in FIG. 3b, a first slider 60 may be conventionally "grabbed" by a pointing device, such as by placing the pointer of the device on the slider and clicking a mouse button, and moving the slider along a rail 62 to select a pulse width. Here, as slider 60 is moved to the right toward W the pulses applied to both lenses generally become wider, and as the slider is moved to the left toward N the pulse width generally becomes narrower. Frequency of the pulses may be synchronous with the horizontal sync frequency of a computer monitor, which may be anywhere from about 50 to 200 Hz or so. Alternately, where the user is not to be looking at the computer screen the frequency may be something different from the synchronization frequency of the computer monitor.

A second slider 64 is provided within window 58, this slider being movable along a rail 66, and serves to select a pulse width bias so that pulses applied to the strong eye may be selected to be longer than pulses applied to the weak eye, thus penalizing the strong eye. In this instance, as slider 64 is moved to the right toward RIGHT, pulse width of pulses applied to the LCD cell or lens covering the right eye are increasingly wider with respect to those applied to the lens covering the left eye so that more occlusion of the right eye occurs. Likewise, as slider 64 is moved to the left, the pulse width of pulses applied to the LCD lens or cell covering the left eye are increased, thus causing more occlusion of the left eye.

Buttons 68, 70 may be included to select between random pulses applied to the LCD lenses covering the eyes or a manual mode wherein operation of the sliders is enabled. In the instance where the random mode is selected, operation of the sliders is disabled, and pseudorandom pulses having a pseudorandom pulse width which may be between about 1 and 200 Hz or so are applied to each of the LCD lenses of the glasses or goggles. This mode may be useful, for example, in facilitating neural vision fusion of a subject with amblyopia by forcing each eye to randomly view an object of focus, such as school homework.

In the above-described embodiment wherein a personal computer is programmed to provide pulses to glasses or goggles via a communications link, a program for facilitating treatment may also be included in the instant invention. Here, by way of example, a video game, cartoon, or similar video experience enjoyable to a child may be presented to the patient for the duration of daily treatment, which as stated may be 30 minutes or so per day. In this video or game, the pulse rate applied to the LCD lenses of the glasses or goggles is synchronized with each video frame so that alternate frames of the video presented by the monitor are viewed by alternate eyes of the patient. Thus, the strong eye may be further penalized by the frames of the video or game associated with the strong eye being degraded in quality. In this instance, during pulse width intervals wherein the weak eye is occluded, the video frame for the strong eye may be presented in black and white instead of color, or the images being faded, blurred or otherwise degraded. In contrast, during intervals wherein the strong eye is occluded, the image frames may be in color or intensified color, or presented in sharp or enhanced detail so as to facilitate neural visual fusion between the two eyes of the patient. This double penalization of the strong eye, i.e. through partial or almost full occlusion and being presented with degraded image frames, is believed to be a very effective treatment for amblyopia in young children.

Significantly, this invention is intended to cover any eyeglasses-type device that selectively occludes vision of at least one eye, either partially or totally. Other embodiments also contemplated by this invention are other types of electronic light control cells, such as POCKEL or KERR cells. Mechanical shutters incorporated in eyeglass lenses would also serve the purpose of occlusion of at least one eye. In yet another embodiment, a pair of eyeglasses or goggles having lenses including a photochromic compound that darkens upon exposure to sunlight or other wavelengths of light may incorporate a pair of miniature lamps, each lamp positioned to illuminate one of the photochromic lenses. The lamps emit a wavelength so as to activate the photochromic compound to darken the lenses, and would be independently activated so that the lens covering the strong eye is selectively darkened during periods of treatment. Such an apparatus may simply be a conventional pair of eyeglasses with photochromic lenses, with the lamps incorporated in a clip-on assembly that is clipped or is otherwise clamped to the bridge or across the top of the eyeglasses. Of course, each lamp would be hooded or shielded so as to illuminate and darken only the associated lens. Power for the lamps may be a stationary power supply connected to the lamps by conductors, this being where treatment is conducted in a stationary setting such as watching television, a computer game, doing homework, etc. Where treatment is undertaken in a mobile setting, a battery pack may be worn by the user, and again conventionally connected to the lamps by conductors.

One feature of the inventions described above is that amblyopia may be treated without impairing neurological development of normal stereoscopic vision, which may occur when treating certain types of amblyopia with a patch. This feature of retention of stereoscopic neurological development is due to either periodically alternating vision between the strong and weak eye, allowing both eyes to function together for brief periods of time or by selectively occluding one eye.

In use, the deviant eye is identified, and a pair of eyeglasses comprising at least the LCD cells as described above is fitted to the wearer. The LCD cell covering the strong eye is driven to a steady state or some variable of that steady state of opaqueness, serving the function as a patch in the prior art. As the weak eye begins to function properly over time, increasing levels of vision may be provided to the strong eye by slowly reducing opacity of the respective LCD cell, allowing pathways in the brain to form so that the wearer develops proper accommodation and binocular vision. Advantages of this system are that there are more options available to a therapist than just a patch that constantly occludes vision, with the capacity to tailor or customize treatment through the use of one or more of these options.

An additional method of treatment to enhance steriopsis is discussed below. The programmable glasses as described above can be utilized in order to treat the effects of amblyopia which reduces binocularity and thereby steriopsis. Here, a "training mode" program may be developed using the glasses in conjunction with a computer with the appropriate programming and a stereoscopic monitor to alter the perception of steriopsis presented on the monitor display. This may be done by software in the computer that exaggerates angular separation of two images that when combined form a stereoscopic image, or two cameras at a spacing greater than the spacing of the eyes may record stereoscopic scenes that are loaded into the computer. Either way, steriopsis presented by the monitor is enhanced by increasing angular separation of the pair of stereoscopic images or a combination of increased angular separation and increased positional separation of the pair of stereoscopic images. The combined effect of alternating the shutters of the glasses in sync with alternate frames of the monitor wherein each alternate video frame has one of the pairs of stereoscopic images is used to generate an enhanced or exaggerated 3 dimensional image. As steriopsis is learned by the subject, it can be strengthened by gradually decreasing the angular separation (and physical separation) of the pair of images, which may be used in conjunction with altering the binocular input from the glasses. Such a system would be useful in treating children who have lost stereoscopic vision due to amblyopia or strabismus. In one variant of this embodiment, a device for m measuring degree or extent of perception of stereiopsis may be constructed by relating the amount of separation of the pair of stereoscopic images presented on the monitor with ability of the subject to detect the stereoscopic image. In another variant of this embodiment, the enhanced steriopsis developed by increased angular separation of a pair of cameras, and possibly exaggerated physical separation of the pair of images presented on a monitor display, may be used in applications where fine, delicate work is performed either by hand or by machine assisted hand operation. One example of where this would be particularly useful exists in microsurgery, such as where tiny blood or other fluid conduits are being reattached. Another medical application exists in eye surgery, such as where it is necessary to tease and remove abnormal tissue growths from the retina of the eye.

Having thus described our invention and the manner of its use, it should be apparent to those skilled in the art to which it pertains that incidental modifications may be made thereto that fairly fall within the scope of the following appended claims, wherein we claim:

What is claimed is:

1. A system for treating eye disorders of the class including amblyopia and strabismus comprising:

a pair of eyeglasses or goggles having a liquid crystal lens covering each eye of a subject, a programmable controller coupled to each said liquid crystal lens, said controller providing control signals to said liquid crystal lenses so as to adjustably reduce and increase vision of a strong eye by adjustably reducing and increasing an amount of light passing through a said liquid crystal lens covering said strong eye, visual stimulus coupled to said controller, said controller providing enhancement signals to said visual stimulus so that when vision of said strong eye is decreased, said visual stimulus is enhanced.

2. A system as set forth in claim 1 wherein said controller provide degrading signals to said visual stimulus when vision of said strong eye is increased so that an image of said visual stimulus is degraded when vision of said strong eye is increased, and said visual stimulus is enhanced when vision of said weak eye is increased.

3. A system as set forth in claim 1 wherein said control signals adustably increase and reduce an amount of light passing through one of said liquid crystal lens in an inverse relation with an increase and decrease in an amount of light passed by the other said liquid crystal lens.

4. A system as set forth in claim 3 wherein said control signals are configured to block a greater proportion of light in said lens covering a strong eye and proportionally less light in said lens covering a weak eye.

5. Apparatus for treating diseases of the class including amblyopia and strabismus, said apparatus comprising:

a frame fitting at least around eyes of a user so that eyes of a user are generally encompassed by said frame, a pair of lenses mounted in said frame so that one lens of said pair of lenses is in front of each eye of a user, control circuitry coupled to each lens of said pair of lenses and configured so that said lenses selectively pass or block visible light in a random manner.

6. Apparatus for treating diseases of the class including amblyopia and strabismus, said apparatus comprising:

a frame fitting at least around eyes of a user so that eyes of a user are generally encompassed by said frame, a pair of lenses mounted in said frame so that a respective lens of said pair of lenses is in front of each eye of a user, each said lens of said pair of lenses configurable to selectively pass or block visible light, control circuitry coupled to each lens of said pair of lenses, said control circuitry incorporating a selectable image presentation device wherein lightening and darkening of each lens of said pair of lenses is synchronized with presentation of an image from said image presentation device, with said image being presented only when said one lens covering a strong eye is darkened and said lens covering a weak eye is lightened.

7. An apparatus as set froth in claim 6 wherein said lens covering a strong eye is darkenable for a greater period of time than said lens covering a weak eye so that light is exposed to a strong eye for a shorter period of time and light containing said image is exposed to a weak eye for a longer period of time.

* * * * *